Aug. 12, 1969  C. E. BRANICK  3,460,419
TIRE CUTTING APPARATUS
Filed Aug. 30, 1967  3 Sheets-Sheet 1
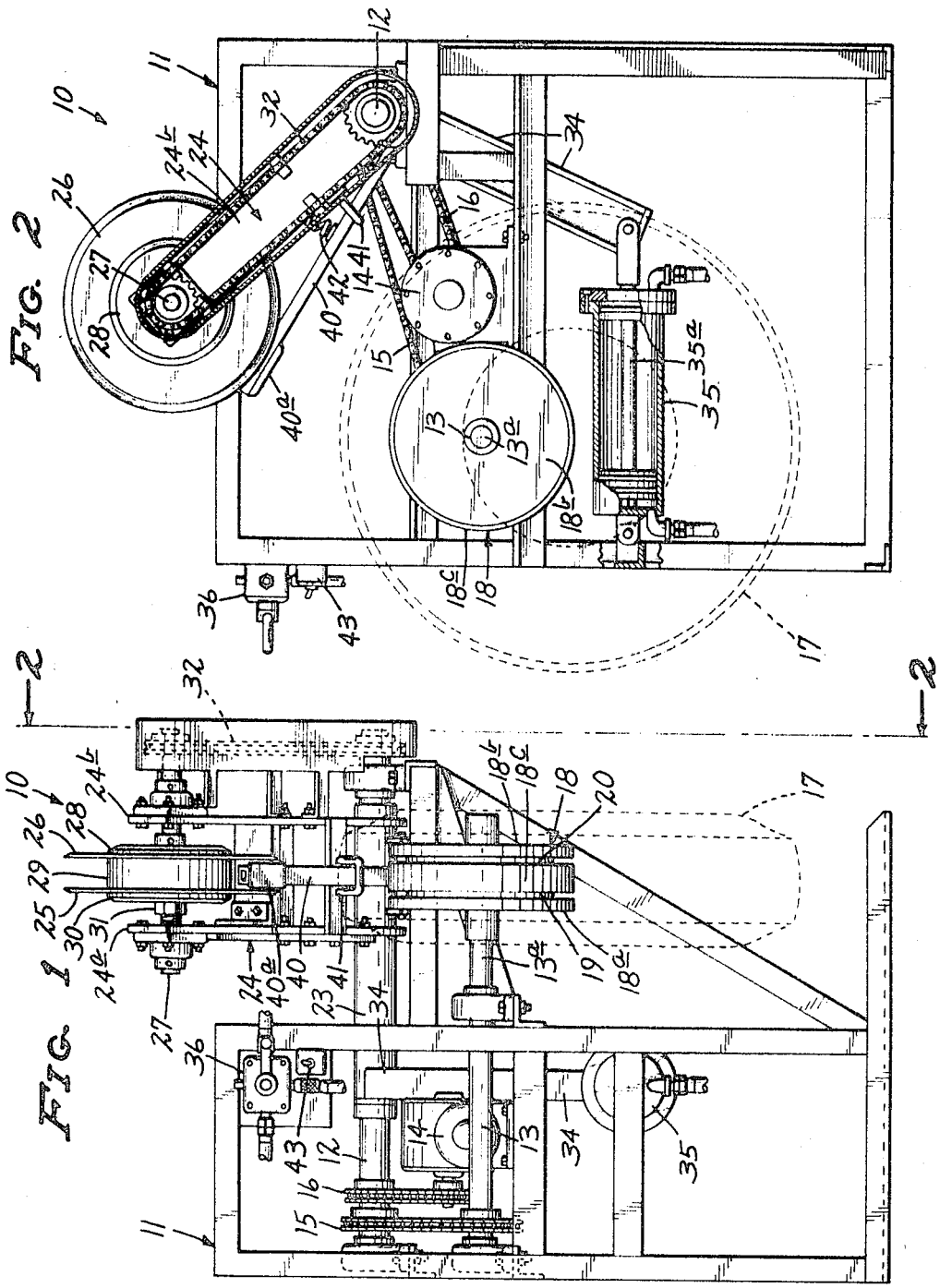
INVENTOR.
CHARLES E. BRANICK
BY
Merchant & Gould
ATTORNEYS

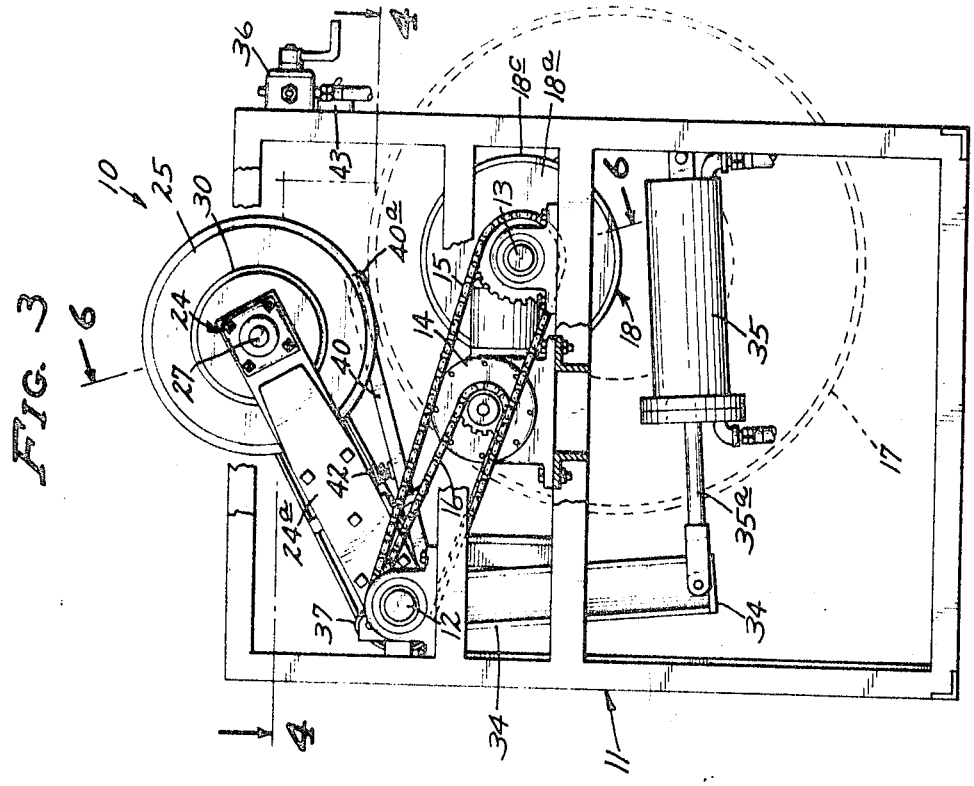
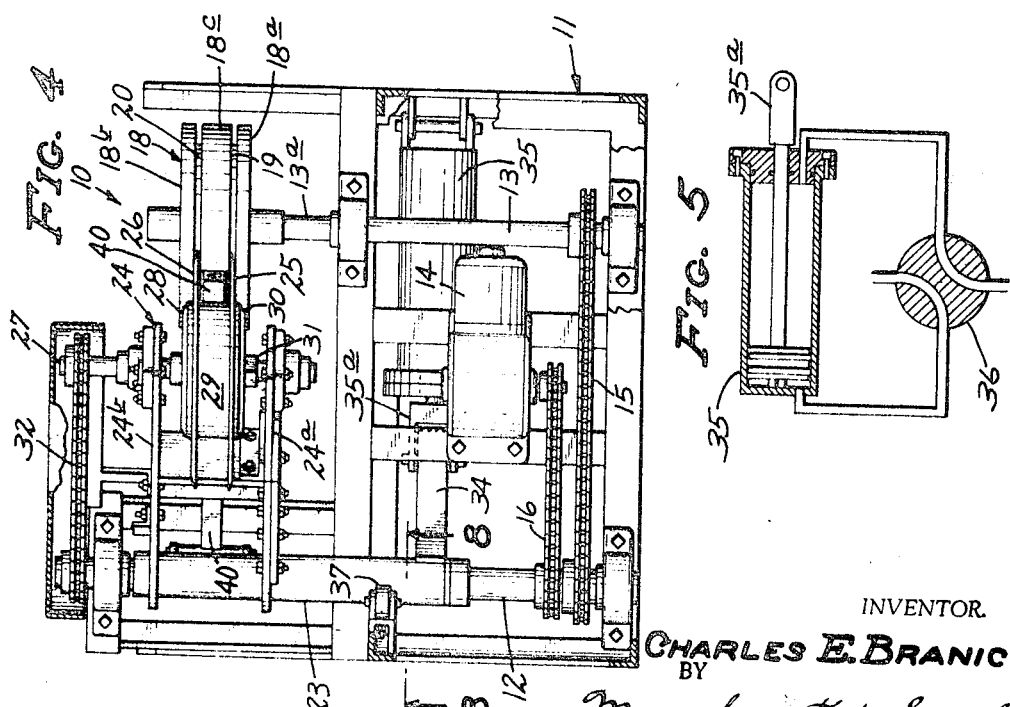

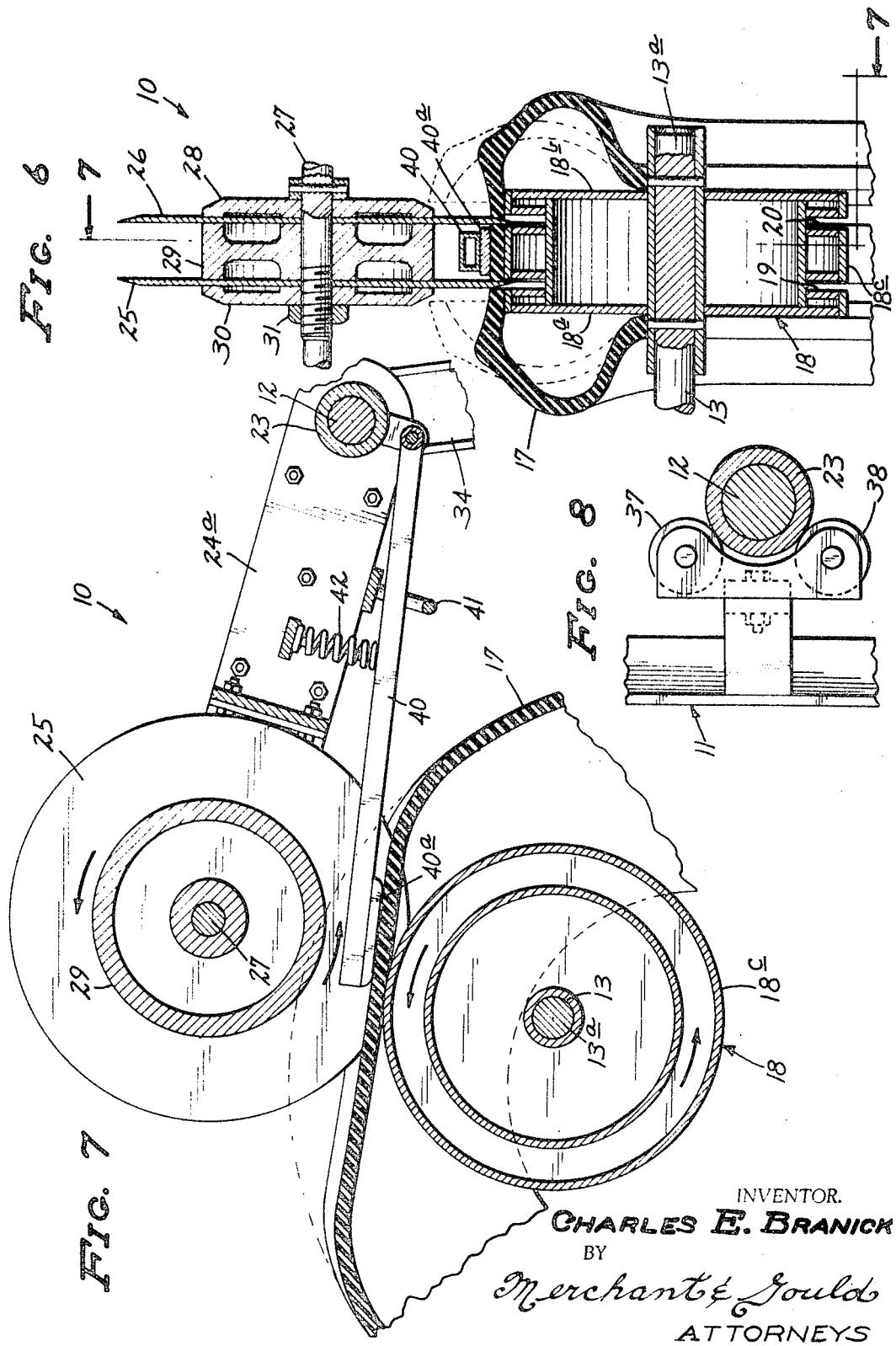

United States Patent Office 3,460,419
Patented Aug. 12, 1969

3,460,419
TIRE CUTTING APPARATUS
Charles Earl Branick, Fargo, N. Dak., assignor to Applied Power Industries, Inc., Milwaukee, Wis., a corporation of Wisconsin
Filed Aug. 30, 1967, Ser. No. 664,521
Int. Cl. B23d 21/04
U.S. Cl. 83—185     13 Claims

ABSTRACT OF THE DISCLOSURE

Apparatus for cutting the side walls away from the crown portion of a scrap tire. The scrap tire is supported by a rotating wheel that is small enough to fit into the central openings of the tire and between the inner side walls of the tire. The tire thus hangs on the wheel with the upwardly facing surface of the wheel lying adjacent the downwardly facing inner crown surface of the tire. A pair of spaced circumferential grooves are formed in the surface of the wheel. A pair of rotating circular knives are mounted for movement toward and away from the surface of the wheel. In the operative tire cutting position, the wheel and knives are rotated in the same direction and the knives are forced through the tire into the correspondingly positioned grooves. The inner crown surface of the tire frictionally engages the surface of the wheel and is rotated therewith while the knives cut the crown away from the side walls of the tire.

BACKGROUND OF THE INVENTION

Field of the invention

This invention relates generally to apparatus for cutting scrap tires in two for saucering and space saving, and also relates to a machine for quickly cutting away the crown portion of a scrap tire from the side walls thereof.

Description of the prior art

Those who deal commercially in the business of replacing pneumatic tires on automotive vehicles usually accumulate large numbers of used tires that have no value except as scrap. Used or scrap pneumatic tires are difficult to store and handle because of their construction. They are not designed to stack well and there is no way that they can be nested together to conserve storage space.

If the used tires are to be scrapped, it is necessary to periodically haul away the accumulated tires. This also presents a problem since only a relatively small number of tires can be carried by a truck. The truck may be capable of carrying many times the weight of tires involved, but because of their configuration, the load cannot be packed to utilize the full capability of the truck.

Because of the storage and handling problems, it is necessary to make many, relatively expensive trips to haul away relatively few tires. If a long distance haul is involved, as in a large city, the expense of storing and hauling the used tires can expand all out of proportion to the intrinsic value of the tires.

SUMMARY OF THE INVENTION

The present invention provides apparatus for quickly reducing the bulk of scrap tires to facilitate their storage and handling. The apparatus of my invention cuts the tire in two or cuts away the crown portion of the tire from the side walls so that the resulting portions can be nested to reduce storage requirements. In addition to increasing the capacity of a given storage area, many more scrap tires can be hauled in a truck of given capacity. A large reduction in the expense of storing and handling scrap tires is therefore achieved through the use of my invention. Besides reducing the bulk of the tires themselves to approximately one-third of their original volume by this saucering operation, other types of scrap can be hauled or stored in the center hole to fully utilize the capacity of a given area.

Scrap tires normally have no commerical value. In fact, they represent a cost item because of the expense of destroying them. When using the apparatus of my invention, however, a profit can be realized by utilizing the one, two or three inch wide piece of tread that is cut from the crown portion of the tire. I have successfully utilized them to make floor matting in a number of different ways. In the case of wood floors, the pieces can be tacked directly to the floor. The pieces can also be adhesively attached to a floor. Floor mats in various sizes have also been made by gluing or otherwise attaching the pieces to a cloth or other fabric type backing material.

BRIEF DESCRIPTION OF THE DRAWINGS

FIGURE 1 is a view in side elevation of a scrap tire cutter constructed in accordance with my invention;

FIGURE 2 is a sectional view as seen from line 2—2 of FIGURE 1;

FIGURE 3 is a view in side elevation as seen from the left side of FIGURE 1, portions thereof being broken away and shown in section, and some parts thereof being shown in different positions;

FIGURE 4 is a horizontal section as seen from line 4—4 of FIGURE 3, portions thereof being broken away;

FIGURE 5 is a diagrammatic view of an air motor and a controller therefor, as utilized in the present invention;

FIGURE 6 is a sectional view taken generally along line 6—6 of FIGURE 3, certain portions thereof having been moved to a different position, shown on an enlarged scale;

FIGURE 7 is a sectional view taken along line 7—7 of FIGURE 6; and

FIGURE 8 is a sectional view taken along line 8—8 of FIGURE 4, on an enlarged scale.

Description of the Preferred Embodiment

Referring to the drawings, wherein like reference numerals are used throughout the several views to indicate like elements of the invention, there is disclosed a scrap tire cutting apparatus 10 having a supporting or mounting frame 11. Frame 11 is designed to support the apparatus on the floor of a shop or other area where the tires are to be cut. Mounted on frame 11 in suitable bearings is a horizontally extending, rotatable drive shaft 12. Also mounted on frame 11 in suitable bearings, and spaced from drive shaft 12, is a second horizontally extending, rotatable drive shaft 13. Parallel mounted shafts 12 and 13 are rotated in a common direction by means of a gear head electric motor 14 and endless link drive members 15 and 16.

Frame 11 is designed such that one end 13a of drive shaft 13 extends into an open area that is sufficiently large to accommodate a pneumatic tire without interference with frame 11. A pneumatic tire 17 is shown in phantom in FIGURES 1, 2, and 3.

Mounted on free end 13a of drive shaft 13 is a cylindrical tire supporting drum or wheel 18. Preferably, wheel 18 is a right circular cylinder having a pair of parallel end plates 18a and 18b connected by a peripheral outside surface indicated generally as 18c. Wheel 18 is fixedly mounted on shaft 13 along its longitudinal axis so that it rotates with shaft 13. Formed in the surface 18c of wheel 18 are a pair of spaced, circumferential grooves 19 and 20. Grooves 19 and 20 lie in parallel planes perpendicular to the axis of rotation of drum or wheel 18. Consequently, surface 18c is effectively divided into three portions separated by grooves 19 and 20, with the middle portion being somewhat wider than the two outside portions.

The diameter of wheel 18 is smaller than the inside diameter of the tire 17 supported thereon. Also, the distance between end plates 18a and 18b is less than the distance between the inner side walls of the tire so that wheel 18 will support a tire 17 in the manner shown in FIGURES 1, 2, and 3. Thus, tire 17 is simply inserted over wheel 18 and is suspended thereon with the opposing beads of the tire supported by shaft 13a on both sides of wheel 18. The upper portion of wheel 18 therefore lies between the opposing side walls of the tire, with the upwardly facing surface of wheel 18 lying generally adjacent the downwardly facing inner crown surface of tire 17.

Mounted on shaft 12 is a sleeve member 23. Sleeve member 23 is rotatable with respect to shaft 12. Drive shaft 12 and sleeve member 23 thus rotates about the same axis, which lies parallel to the axis of rotation of shaft 13.

Mounted on sleeve member 23 is a perpendicular supporting arm 24 comprising a pair of spaced flat arms 24a and 24b. One end of each of the arms 24a and 24b is welded or otherwise securely attached to sleeve member 23. The other ends are positioned generally above drum 18 for swinging movements toward and away from the grooved surface of drum 18. Flat arms 24a and 24b lie in parallel, spaced planes, which planes are also parallel to the planes extending through grooves 19 and 20.

Mounted for rotation at the free end of supporting arm 24 are a pair of circular knives 25 and 26. Each of the knives 25 and 26 is constructed from a single piece of metal and has a sharpened peripheral edge. Knives 25 and 26 are mounted for rotation on a shaft 27 that extends through the ends of arms 25a and 24b and is supported by suitable bearings. To support knives 25 and 26 for rotation with shaft 27, a clamping device including a fixed end clamp portion 28, a movable center clamp portion 29 and a movable end clamp portion 30 is provided. Bearing against end clamp portion 30 to tighten the clamping device is a nut 31 threadedly attached to shaft 27.

To provide the motive power to rotate shaft 27, which lies in parallel with shaft 12, an endless link drive assembly 32, connecting shaft 12 and shaft 27, is provided. Shaft 27 is rotated in the same direction as shaft 12 and shaft 13.

Mounted generally at the opposite end of sleeve member 23 from supporting arm 24 is a second arm member 34. One end of second arm member 34 is welded or otherwise securely attached to sleeve member 23, and second arm member 34 extends perpendicular to sleeve member 23. With sleeve member 23 positioned such that supporting arm 24 extends in a generally horizontal direction therefrom, second arm member 34 extends generally downwardly from sleeve 23, with the angle between the two arm members being slightly greater than 90 degrees.

Connected between frame 11 and the free end of second arm member 34 is a ram member 35. Ram member 35 comprises an air operated piston device having an operating shaft 35a that is connected to the end of arm member 34. As shown in FIGURE 5, a suitable control valve 36 is provided to direct compressed air into ram member 35 so that shaft 35a is either retracted or extended, as desired.

When compressed air is supplied to ram member 35 to extend shaft 35a, the free end of second arm member 34 is carried with it to rotate sleeve member 23 about shaft 12. To provide further support for shaft 12 and sleeve member 23 during this operation, a pair of rollers 37 and 38 are mounted on frame 11 between frame 11 and sleeve member 23. Rollers 37 and 38 support the generally central section of sleeve member 23 as shown in FIGURE 8. As sleeve member 23 is rotated by the pivotal movement of second arm member 34, supporting arm 24 is pivoted a similar amount toward drum 18. Thus, the movement of second arm member 34 by ram member 35 effects the like movement of supporting arm 24, toward or away from the upper surface of drum 18.

Knives 25 and 26 lie in parallel planes, which are the same planes which extend through grooves 19 and 20. Consequently, when supporting arm 24 is moved downwardly toward drum 18, knives 25 and 26 enter grooves 19 and 20 in the surface of the drum.

Pivotally attached at one of its ends to sleeve member 23 is a press arm 40, the free end of which lies between the bottom portions of circular knives 25 and 26. The upward movement of the free end of press arm 40 is limited by center clamp portion 29. The downward movement of press arm 40 is limited by a U-shaped stop member 41 secured to supporting arm 24. Press arm 40 is free to pivot between these two obstructions toward and away from supporting arm 24. A coiled spring 42 is mounted between press arm 40 and supporting arm 24 to bias press arm 40 in a downward direction away from supporting arm 24. Mounted on the under surface of the free end of press arm 40 is a smooth pad 40a.

OPERATION

With motor 14 deenergized, and with shaft 35a of ram member 35 in the retracted position, circular knives 25 and 26 are separated a sufficient distance from drum 18 so that a scrap tire 17 can be inserted over drum 18. This inoperative position of the apparatus is shown in FIGURES 1 and 2.

When the scrap tire to be cut is placed over wheel 18, motor 14 is energized by means of a switch 43. With motor 14 energized, shafts 12 and 13 begin to rotate in the same direction to cause the rotation of drum 18 and the circular knives 25 and 26 in the same direction. As shown in FIGURE 2, drum 18 and the circular knives 25 and 26 rotate in a counter-clockwise direction.

Control valve 36 is then operated to provide compressed air to ram member 35 to extend shaft 35a. As shaft 35a moves toward its extended position, second arm member 34 is carried with it to rotate sleeve member 23, to in turn move circular knives 25 and 26 downwardly toward drum 18. As supporting arm 24 moves toward drum 18, the smooth pad 40a on press arm 40 makes contact with the upper crown surface of tire 17. Shortly thereafter, the rotating circular knives 24 and 26 also make contact with the crown portion of the tire. As shaft 35a continues to extend, knives 25 and 26 are forced downwardly through the crown surface of the tire into grooves 19 and 20. At this point, smooth pad 40a of press arm 40 is pressing firmly downwardly against the crown portion of tire 17 to force it into frictional engagement with the upwardly facing surface 18c of wheel 18. Press arm 40 thus serves to hold the crown portion of the tire tightly against the surface of rotating wheel 18 so that there is sufficient frictional engagement to cause the tire to rotate in the same direction as wheel 18. As the tire rotates in a counter-clockwise direction, as seen in FIGURE 2, with wheel 18, circular knives 25 and 26 also rotate in a counter-clockwise direction to cut the crown portion of the tire away from the side walls thereof.

FIGURE 3 depicts the initial entrance of the rotating knives into the crown surface of tire 17 (shown by dotted lines). The smooth pad 40a of press arm 40 has engaged the crown surface between the knives and has begun to compress spring 42. As the circular knives continue to penetrate downwardly through the tire, as shown particularly in FIGURES 6 and 7, into grooves 19 and 20, press arm 40 forces the inner crown surface of the tire into engagement with surface 18c of drum or wheel 18. At this point, tire 17 begins to rotate in a counter-clockwise direction with wheel 18 and rotating circular knives 25 and 26 cut the tire as it moves into them.

After the tire has made one complete revolution, the side walls are cut away from the crown portion. Control valve 36 is then reversed to retract shaft 35a to in turn swing or pivot knives 25 and 26 away from drum 18. Motor 14 is then deenergized and the tire, now in three pieces, is removed. The entire process is then repeated for another tire.

In the preferred embodiment of my invention, drum 18 rotates at approximately eight and one-half revolutions per minute while knives 25 and 26 rotate at approximately thirty-six revolutions per minute. Since the knives are rotating at a faster speed than the drum, a cutting action at the leading edge of the tire is achieved so that the knives offer little resistance to the rotation of the tire with drum 18. Further, since the knives cut upwardly from the inner toward the outer surface of the crown portion of the tire, there is little tendency for the knives to bind in the tire. Further, the sharp edges of knives 25 and 26 are beveled only on the outer faces so as to present a constant dimension between the knives radially inwardly from the edges, thereby preventing binding of the center crown portion between the knives. In actual practice, the present invention will completely cut apart a normal automobile tire in about ten seconds.

Although I have described herein the preferred embodiment of my invention, it will be apparent that changes within the spirit and scope of the invention may be made by those skilled in the art. Therefore, I intend to be bound only by the scope of the appended claims.

I claim:
1. Tire cutting apparatus, comprising:
 (a) a frame;
 (b) a cylindrical tire supporting drum rotatably mounted on said frame, said drum having an outside diameter smaller than the diameter of the central opening of a tire supported thereon and having a length shorter than the distance between the inner side walls of the tire, said drum having a pair of spaced, circumferential grooves formed in the surface thereof lying in parallel planes perpendicular to the axis of rotation of said drum;
 (c) a supporting arm having a first end mounted on said frame for pivotal movements of said arm about an axis lying parallel to the axis of rotation of said drum and having a second end positioned generally above said drum for swinging movements toward and away from said grooved surface of said drum;
 (d) a pair of spaced circular knives mounted for rotation on said second end of said supporting arm, said circular knives each being positioned in one of said parallel planes, said knives extending into said grooves in said drum upon movement of said arm toward said drum; and
 (e) means for rotating said drum and said circular knives in a common direction of rotation.
2. The apparatus of claim 1 wherein a rotatable sleeve member is mounted on said frame for rotation about an axis parallel to the axis of rotation of said drum, and wherein said first end of said supporting arm is fixedly connected to said sleeve member, said supporting arm extending perpendicular to said sleeve member.
3. The apparatus of claim 2 wherein said sleeve member is mounted on a rotatable drive shaft, and wherein means are provided to drive said circular knives from said drive shaft.
4. The apparatus of claim 2 wherein means are provided to rotate said sleeve member to move said pair of circular knives toward and away from said drum.
5. The apparatus of claim 4 wherein said means for rotating said sleeve member includes a second arm member, having first and second ends, secured by its first end to said sleeve member and connected at its second end to an extendable shaft of a ram member mounted on said frame, and means for energizing said ram member to operate said shaft.
6. The apparatus of claim 5 wherein said supporting arm and said second arm member lie in parallel planes, and wherein said ram member includes an air operated piston to operate said shaft.
7. The apparatus of claim 2 wherein a press arm having first and second ends is pivotally attached at said first end to said sleeve, said second end being located between said circular knives in position to contact the crown of a tire supported by said drum upon movement of said knives toward said drum, and wherein spring means are mounted between said press arm and said supporting arm to bias said press arm toward said tire.
8. Tire cutting apparatus, comprising:
 (a) a frame;
 (b) a tire supporting drum mounted on said frame for rotation about a horizontal axis, said drum being sized to fit into the central opening of the tire to be cut and between the inside walls of the tire, said drum having at least one groove formed circumferentially in the surface thereof in a plane lying perpendicular to the axis of rotation of said drum;
 (c) a circular knife rotatably mounted on said frame for movements toward and away from the top surface of said drum, said circular knife lying in the same plane as the plane of said groove;
 (d) means for rotating said drum and said circular knife in a common direction of rotation; and
 (e) means for forcing said circular knife downwardly into said groove to cut through the crown surface of a tire supported by said drum.
9. The apparatus of claim 8 including a flexible press arm mounted on said frame for movement with said circular knife, said press arm being positioned adjacent said knife to contact the crown surface of a tire supported by said drum during the cutting operation to aid in forcing the inner crown surface of the tire into frictional engagement with the surface of said drum.
10. Apparatus for cutting the side walls away from the crown portion of scrap tire, comprising:
 (a) a frame;
 (b) a tire supporting wheel mounted on said frame, said wheel having a diameter smaller than the diameter of the central opening of the tire, the tire being positioned over said wheel, parallel thereto, with the upwardly facing surface of the wheel lying adjacent the downwardly facing inner crown surface of the tire;
 (c) a pair of spaced, parallel, circular knives mounted on said frame for rotation about an axis lying parallel to the axis of rotation of said wheel;
 (d) means for moving said knives and said wheel surface into engagement to cut through the crown surface of a tire supported on said wheel; and
 (e) means for rotating said wheel and said knives in a common direction.
11. The apparatus of claim 10 wherein a pair of cir- cumferential spaced grooves are formed in the surface of said wheel, each of said grooves lying in the same plane with one of said pair of knives, said knives extending into said grooves during the cutting operation.

12. The apparatus of claim 11 wherein press arm means are mounted on said frame between said circular knives to hold the crown portion of the tire in engagement with said wheel surface for a short distance after being cut from the side walls.

13. The apparatus of claim 10 wherein the peripheral edges of the knives are beveled only on the outer faces to provide a constant dimension between the knives.

References Cited

UNITED STATES PATENTS

| | | | |
|---|---|---|---|
| 1,121,924 | 12/1914 | Johnston | 83—422 |
| 1,197,522 | 9/1916 | Mason | 83—492 |
| 1,610,048 | 12/1926 | Grove | 83—434 X |
| 3,398,615 | 8/1968 | Grabill | 83—187 X |

FRANK T. YOST, Primary Examiner

U.S. Cl. X.R.

83—187, 422, 434, 490, 492, 647